Figure 1:
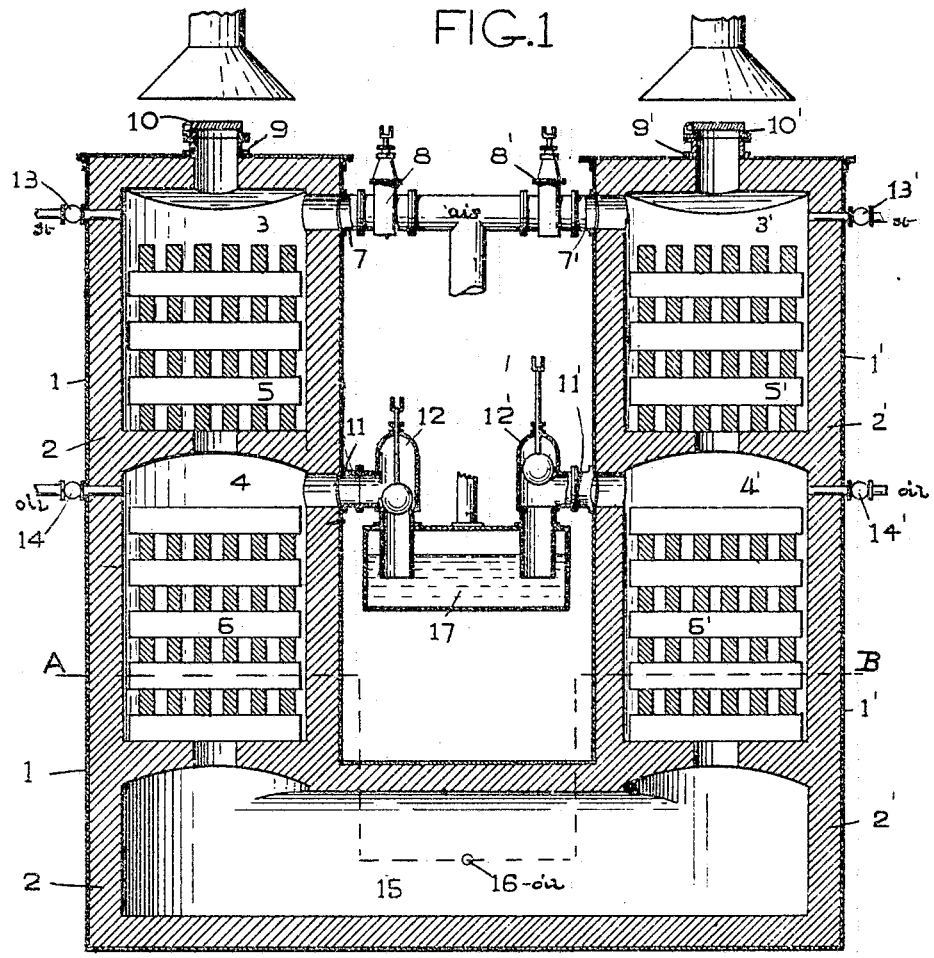

No. 781,836. PATENTED FEB. 7, 1905.
L. P. LOWE.
APPARATUS FOR MANUFACTURING GAS.
APPLICATION FILED JUNE 17, 1903.

WITNESSES
K. Lockwood-Nevins
M. Stuart

INVENTOR
L. P. Lowe
By Francis M. Wright.
Attorney.

No. 781,836. Patented February 7, 1905.

UNITED STATES PATENT OFFICE.

LEON P. LOWE, OF SAN FRANCISCO, CALIFORNIA.

APPARATUS FOR MANUFACTURING GAS.

SPECIFICATION forming part of Letters Patent No. 781,836, dated February 7, 1905.

Application filed June 17, 1903. Serial No. 161,792.

*To all whom it may concern:*

Be it known that I, LEON P. LOWE, a citizen of the United States, residing at San Francisco, in the county of San Francisco and State of California, have invented certain new and useful Improvements in Apparatus for Manufacturing Gas, of which the following is a specification.

My invention consists in an improved apparatus for generating manufactured gases from hydrocarbon oils, preferably in the form of crude petroleum or its derivatives.

My invention embodies novel features, as will be hereinafter set forth and definitely claimed.

I have found that if hydrocarbon oils are brought into contact with surfaces heated to a sufficiently-high degree the oils are decomposed and converted into compounds consisting of fixed gases, condensable hydrocarbons, and solid carbonaceous substances, the latter being usually in the form of lampblack. I have found that if simultaneously with the decomposition of the hydrocarbon substance, as stated, water-vapor, preferably in the form of steam, is brought into contact therewith a chemical action takes place between the steam and lampblack, whereby a combination is effected, the resultant compound being the non-luminous or so-called "blue water-gas." I have also found that in order to make this process fully effective it is necessary to maintain the solid carbon at a high degree of incandescence and to hold into contact therewith the steam over a comparatively long space of time, as the union of the oxygen of the steam and solid carbon does not seem to be an immediate one and is attained with more or less mechanical and chemical difficulty. To accomplish this result, I have devised an apparatus for breaking down the hydrocarbons, a portion of which I intentionally convert into solid carbonaceous form, such as lampblack, by the use of a very high degree of heat, simultaneously admitting steam into the apparatus in contact with the solid carbon formed, and after the decomposition of the hydrocarbon substances I continue the passage of the resultant products, together with the steam admitted, as described above, in further contact with and over a considerable distance of additional highly-heated surface to insure the proper decomposition and uniting of the steam and carbon as described. I have found that in order to make the process commercially successful it is necessary to first superheat the hydrocarbon substances and steam used to such a point that they will not too quickly absorb the keen high degree of heat used for the purpose of breaking down the hydrocarbons, and this I accomplish by conserving heats in my apparatus which would otherwise go to waste.

To accomplish the foregoing, I use the apparatus or modifications of the same shown in the accompanying drawings, of which the following is a description.

Figure 2:
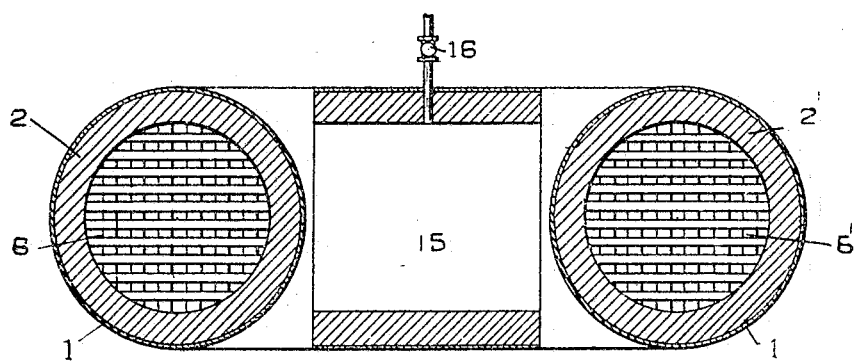

Figure 1 represents a vertical sectional elevation of the apparatus embodying my invention. Fig. 2 represents a sectional plan of same on line A B of Fig. 1.

Similar numerals of reference indicate corresponding parts in both figures.

1 and 1' are shells which I term "combined superheaters" and "gas-generators," the upper portion being the superheater, while the lower portion is the gas-generator. They are preferably of cylindrical form and preferably composed of metal.

2 and 2' are refractory linings, preferably in the form of fire-brick, contained within the body of the shells 1 and 1'.

3 and 3' are chambers contained within the upper portions of the shells 1 and 1'.

4 and 4' are chambers contained within the lower central portions of the shells 1 and 1'.

5 and 5' are open-work checkered fillings of refractory substance, preferably in the form of loosely-piled fire-bricks contained within the chambers 3 and 3'.

6 and 6' are checkered fillings of refractory substance, preferably in the form of loosely-piled fire-bricks contained within the chambers 4 and 4'.

7 and 7' are openings for the purpose of admitting air to chambers 3 and 3'.

8 and 8' are blast-valves controlling the air-openings 7 and 7'.

9 and 9' are outlet-openings from top of shells 1 and 1'.

10 and 10' are stack-valves controlling the openings 9 and 9'.

11 and 11' are gas-take-off openings from chambers 4 and 4'.

12 and 12' are valves controlling the openings 11 and 11'.

13 and 13' are suitably-controlled steam-pipes entering chambers 3 and 3'.

14 and 14' are suitably-controlled hydrocarbon-supply pipes entering chambers 4 and 4'.

15 is a combustion-chamber common to both the shells 1 and 1'.

16 is a suitably-controlled hydrocarbon-injector.

17 is a hydraulic seal receiving the outlet-pipes from gas take-offs 11 and 11'.

When I desire to put this apparatus into operation, I proceed as follows: I close the stack-valve 10' and open the stack-valve 10 and air-supply valve 8', through which I admit air either by natural or forced draft, as may be preferred. I then build a light fire in the combustion-chamber 15, with which to ignite the hydrocarbon, which I supply through injector 16. The heat resulting from the combustion of this hydrocarbon passes over and around the refractory substances 6 contained within the chamber 4, from whence they escape into chamber 3, passing over and around the refractory substances 5 contained therein, the products of combustion finally escaping through opening 9 and valve 10. By this heating operation the loosely-piled refractory substances 5 and 6 are brought to a high degree of incandescence, the hottest portions being those next adjacent to the combustion-chamber 15, the heats gradually lessening in the direction toward the opening 9. When the loosely-piled substances 6 and 5 have been brought to the desired temperature, which can be observed by inspection through a sight-hole suitably placed in the side of shell 1, I reverse the process of heating by temporarily discontinuing the combustion of the hydrocarbon through the injector 16, after which I close the air-valve 8'. I then open the stack-valve 10' and close the stack-valve 10, after which I admit air to chamber 3 by opening the air-valve 8. I then re-create combustion in the fire-box 15 by supplying hydrocarbon through the injector 16, passing the air in a downward direction over the surfaces of the loosely-piled substances 5 and 6 in a reverse direction to that in which they were heated, thus supplying a highly-heated blast to support the combustion in the chamber 15, the products of which escape over the surface of the loosely-piled substances 6' and 5' contained within the chambers 4' and 3', the products of combustion finally escaping through the opening 9' and stack-valve 10'. It will then be seen that I heat the contents of the chambers 1 and 1' alternately, and by reversing this process of heating a sufficient number of times I finally bring my apparatus into a sufficiently-heated state to proceed with the regular operation of gas-making, when I proceed as follows: Assume that the heating operation next previous to gas-making has been conducted by passing air through the chambers contained within the shell 1 and storing the heat within the chambers contained within the shell 1', which has thereby been gotten into gas-making condition. I then discontinue combustion in the chamber 15 by closing the hydrocarbon-injector 16, after which I discontinue the air-supply at valve 8 and close valve 10'. I then open valve 12', after which I admit steam through pipe 13 and hydrocarbon through pipe 14. The steam admitted through pipe 13 passes downward over the surface of the refractory filling 5 contained within the chamber 3, thus becoming highly superheated, after which it enters chamber 4 and mingles with the vapors caused by the distillation of the hydrocarbon supplied through pipe 14. The superheated steam and hydrocarbon-vapors then passes downward over the highly-heated surface of the loosely-piled substance 6 contained within the chamber 4, during which operation the highly-heated carbon-vapors are decomposed, the resultant mixture being a combination of fixed gases, condensable hydrocarbons, and solid carbonaceous substances, the latter usually in the form of lampblack, in which form the carbon is in condition to unite with the highly-superheated steam. The resulting mixture then passes through the highly-heated combustion-chamber 15 and over the surface of the refractory substances 6' contained with the chamber 4', thus keeping the steam and solid carbonaceous substances in contact with one another over a sufficiently-long period to allow of the complete decomposition of the steam, thus adding largely to the volume of so-called "blue water-gas" which mingles with the gases resulting primarily from the decomposition of the oil. The completed gases then leave chamber 4' through opening 11' and valve 12' into a washing-box or hydraulic seal 17, after which they pass off to washers, scrubbers, and purifiers in the usual manner. When the heats in the chambers contained within the shells 1 and 1' have fallen to such a point as to improperly make and fix the gas, I discontinue the gas-making operation by closing off the hydrocarbon supply at pipe 14 and steam-supply at pipe 13, and I close the gas-outlet valve 12'. I then restore the heats following the gas-making operation described by using the heated contents of shell 1' as an air-heater, thus restoring the heats in the contents of the shell 1, which will next be used as a gas-fixing chamber. This I accomplish by opening stack-valve 10 and air-supply valve 8'. I create combustion in the chamber 15 by supplying hydrocarbon through the injector 16, which combustion I support by the air entering through valve 8', which becomes highly heated in its passage over the refractory substances 5' and 6' contained within the chambers 3' and 4'. The resulting heat from this combustion I store in the refractory substances 6 and 5 contained with the chambers 4 and 3, the products of combustion finally passing out through opening 9 and valve 10. When the refractory substances 6 and 5 are sufficiently heated, I discontinue combustion in chamber 15 by closing hydrocarbon-supply 16. I then close air-supply at valve 8' and close stack valve 10. I then open gas-outlet valve 12 and admit steam at pipe 13' and hydrocarbon at pipe 14', the resulting steam and hydrocarbon vapors passing downward over the surfaces of the refractory substances 5' and 6' into and through the combustion-chamber 15 and from thence over the surface of the highly-heated refractory substance 6 contained within the chamber 4, as with the gas-making operations previously described when operating in the reverse manner, the resulting gases passing from opening 11 through valve 12 into the hydraulic seal 17, from whence it escapes and is cared for in the usual manner. When in turn the highly-heated substances become too much cooled for proper gas-making, I restore heats as previously described, the operations of heating and gas-making being intermittent and reversed, the chambers contained within the shells 1 and 1' being alternately air-heaters and gas-fixing chambers, as described.

It is practicable to use but one chamber within both shells 1 and 1' instead of two, as shown; but for purposes of superheating the steam before bringing it into contact with the hydrocarbon vapors and for convenience and ease of repairs to the apparatus I prefer the arrangement as described.

This gas-making apparatus can be of any convenient form and construction, and I do not limit myself to any particular design; but in ordinary operation I prefer the arrangement as shown.

I claim—

1. The combination of the two shells, each having a mediate chamber, and also having a common terminal combustion-chamber connecting the two shells, loosely-piled refractory material in each shell above and below said mediate chamber, a steam-supply pipe, an air-inlet pipe, and a flue at the end of each shell opposite to the common combustion-chamber, a fluid-hydrocarbon pipe and a gas-outlet pipe opening into each of said mediate chambers, and suitable valves for controlling said pipes, substantially as described.

2. The combination of the two shells, each having a mediate chamber, and also having a common terminal combustion-chamber connecting the two shells, loosely-piled refractory material in each shell above and below said mediate chamber, a steam-supply pipe, an air-inlet pipe, and a flue at the end of each shell opposite to the common combustion-chamber, a fluid-hydrocarbon pipe and a gas-outlet pipe opening into each of said mediate chambers, a common hydraulic seal for said gas-outlet pipes, and suitable valves for controlling said pipes, substantially as described.

3. The combination of the two shells, each having a mediate chamber, and also having a common terminal combustion-chamber connecting the two shells, a fluid-hydrocarbon-supply pipe entering said common combustion-chamber, loosely-piled refractory material in each shell above and below said mediate chamber, a steam-supply pipe, an air-inlet pipe, and a flue at the end of each shell opposite to the common combustion-chamber, a fluid-hydrocarbon pipe and a gas-outlet pipe opening into each of said mediate chambers, and suitable valves for controlling said pipes, substantially as described.

4. The combination of the two shells having individual chambers and also a common terminal combustion-chamber, a fluid-hydrocarbon-supply pipe entering said common combustion-chamber, loosely-piled refractory material between the latter and each of the individual chambers, a steam-supply pipe, an air-inlet pipe and a flue at the end of each shell opposite to the common combustion-chamber, a fluid-hydrocarbon pipe and a gas-outlet pipe opening into each of the individual chambers, and suitable valves for controlling said pipes, substantially as described.

In witness whereof I have hereunto set my hand in the presence of two subscribing witnesses.

L. P. LOWE.

Witnesses:
 FRANCIS M. WRIGHT,
 M. STUART.